(12) United States Patent
Ono et al.

(10) Patent No.: US 6,517,942 B1
(45) Date of Patent: Feb. 11, 2003

(54) MAGNETIC RECORDING MEDIUM AND MANUFACTURING METHOD THEREOF

(75) Inventors: Toshitsugu Ono, Miyagi (JP); Tomohiro Sato, Miyagi (JP); Yuji Aoyama, Miyagi (JP)

(73) Assignee: Sony Corporation, Tokyo (JP)

( * ) Notice: Subject to any disclaimer, the term of this patent is extended or adjusted under 35 U.S.C. 154(b) by 49 days.

(21) Appl. No.: 09/698,680

(22) Filed: Oct. 27, 2000

(30) Foreign Application Priority Data

Oct. 29, 1999 (JP) .......................................... 11-308153

(51) Int. Cl.$^7$ .............................................. G11B 5/702
(52) U.S. Cl. .............................. 428/425.9; 428/694 BU; 428/694 BL; 428/900; 427/128
(58) Field of Search ........................ 428/428.9, 694 BU, 428/694 BL, 900; 427/128

(56) References Cited

U.S. PATENT DOCUMENTS

| | | | |
|---|---|---|---|
| 5,681,919 A | 10/1997 | Amirsakis et al. | 528/287 |
| 5,922,469 A | 7/1999 | Wünsch et al. | 428/425.9 |
| 5,922,824 A | 7/1999 | Amirsakis | 528/71 |
| 6,221,468 B1 * | 4/2001 | Murayama et al. | 428/215 |
| 6,224,967 B1 * | 5/2001 | Murayama et al. | 428/216 |

FOREIGN PATENT DOCUMENTS

| | | | | |
|---|---|---|---|---|
| DE | 197 57 670 A1 | 7/1999 | .......... | G08G/18/42 |
| EP | 0 926 661 A2 | 6/1999 | .......... | G11B/5/702 |
| EP | 1 022 726 A1 | 7/2000 | .......... | G11B/5/702 |
| EP | 1 035 145 A2 | 9/2000 | .......... | C08G/18/42 |
| JP | XP-002154740 | 7/1995 | .......... | G11B/5/702 |
| JP | 08127632 | 5/1996 | .......... | C08G/18/42 |

* cited by examiner

*Primary Examiner*—Stevan A. Resan
(74) *Attorney, Agent, or Firm*—Sonnenschein, Nath & Rosenthal

(57) ABSTRACT

A magnetic recording medium includes a magnetic layer, main components of which are magnetic powder and a binder, and a non-magnetic substrate on which the magnetic layer is formed. The binder is a polyurethane resin including a propanediol derivative expressed by the following general formula as an ingredient. The polyurethane resin has a urethane group concentration of 4,000 or more equivalents per 1 t of the resin, and a glass transition temperature of 100° C. or more, preferably,

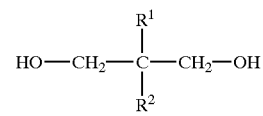

where either or both of $R^1$ and $R^2$ in the general formula is a saturated hydrocarbon group having a carbon number of 2 to 8 and the remnant is a saturated hydrocarbon.

26 Claims, 3 Drawing Sheets

FIG. 2

| | | RESIN A | RESIN B | RESIN C | RESIN D | RESIN E | RESIN F |
|---|---|---|---|---|---|---|---|
| CONSTITUENT UNIT (MOLAR RATIO) | DMH | 1 | 1 | 1 | 1 | 1 | |
| | NPG | | | | | | 1 |
| | POLYESTER DIOL A | | 0.02 | 0.05 | 0.08 | 1 | |
| | MDI | 0.98 | 0.98 | 1.02 | 1.05 | 1.89 | 0.98 |
| URETHANE GROUP CONCENTRATION (eq/t) | | 4800 | 4500 | 4000 | 3600 | 1400 | 5600 |
| NUMBER-AVERAGE MOLECULAR WEIGHT | | 24000 | 23000 | 21000 | 22000 | 21000 | 22000 |
| GLASS TRANSITION TEMPERATURE (°C) | | 120 | 110 | 100 | 90 | 80 | 90 |

FIG. 3

| POLYURETHANE RESIN | | | A | B | C | D | E | F |
|---|---|---|---|---|---|---|---|---|
| SAMPLE TAPE | | | A | B | C | D | E | F |
| GLOSS | BEFORE ADDING CROSS-LINKING AGENT | | 195 | 190 | 185 | 180 | 175 | 180 |
| | AFTER ADDING CROSSLINKING AGENT | | 200 | 190 | 190 | 160 | 140 | 110 |
| MAGNETOSTATIC CHARACTERISTICS | RESIDUAL FLUX DENSITY (mT) | | 270 | 260 | 255 | 235 | 220 | 190 |
| | SQUARE-LOOP RATIO | | 0.865 | 0.865 | 0.855 | 0.840 | 0.835 | 0.830 |
| ELECTROMAGNETIC CHARACTERISTICS | REPRODUCED OUTPUT (dB) | | +2.5 | +2.0 | +1.5 | +1.0 | +0.5 | +0.0 |
| | Y-S/N (dB) | | +2.0 | +1.5 | +1.0 | +0.0 | -0.5 | -1.0 |
| RUNNING DURABILITY | DETERIORATION OF REPRODUCED OUTPUT (dB) | | 0.5 | 0.7 | 1.4 | 1.8 | 2.1 | 2.5 |
| | POWDER FALL AMOUNT | | 0.5 | 1 | 1.5 | 2 | 3 | 3 |

MAGNETIC RECORDING MEDIUM AND MANUFACTURING METHOD THEREOF

RELATED APPLICATION DATA

The present application claims priority to Japanese Application No. P11-308153 filed Oct. 29, 1999, which application is incorporated herein by reference to the extent permitted by law.

BACKGROUND OF THE INVENTION

1. Field of the Invention

The present invention relates to a magnetic recording medium composed of a magnetic layer, main components of which are magnetic powder and a binder, and a non-magnetic substrate, on which the magnetic layer is formed, and further relates to a manufacturing method thereof.

2. Description of the Related Art

For manufacturing a coating type magnetic recording medium such as a magnetic tape and a magnetic disk, generally, a magnetic coating compound is first prepared by kneading ferromagnetic powder, a binder, a dispersant, a lubricant, an abrasive and the like in an organic solvent to disperse them. And then, the magnetic layer is formed by coating the magnetic coating compound on a non-magnetic substrate such as a polyester film, and further by drying the coated material.

The binder that is a main compounding ingredient together with the ferromagnetic powder in the ingredients constituting the magnetic coating compound is compounded for keeping the ferromagnetic powder being bound in the magnetic layer. Then such features are required for the binder as dispersibility of the ferromagnetic powder into the binder is good, and as the dispersibility of the ferromagnetic powder is not easily deteriorated when the magnetic coating compound is kept to be standing for a fixed term, and further as the dispersibility of the ferromagnetic powder does not deteriorate even if a lubricant or a crosslinking agent is added to the magnetic coating compound, namely dispersion stability of ferromagnetic power with the binder is good.

Conventionally, in such a kind of the field, there are used binders such as a vinyl chloride copolymer, a polyurethane resins an acrylonitrile-butadiene copolymer, a cellulosic resin, an epoxy resin, and an acrylic resin.

In this case, for example, a polyester polyurethane resin, to which a hydrophilic group is introduced in a moderate ratio, is frequently used for improving the absorption of the resin into the ferromagnetic powder or the dispersibility of the ferromagnetic powder. UR-8200 manufactured by Toyobo Co., Ltd. can be cited as a polyester polyurethane resin that has conventionally been used. The polyester polyurethane resin includes, in its polyester polyol part, ingredients such as a terephthalic acid or an isophthalic acid as a dicarboxylic acid ingredient and an ethylene glycol as a polyol (diol) ingredient.

On the other hand, recently, for realizing a change of the magnetic recording medium to be one having a high recording density, it is promoted to change the particles of the ferromagnetic powder to be dispersed in the magnetic layer to fine particles. However, solubility of the polyester polyurethane resin to an all-purpose organic solvent, including not only a separated solvent but also a mixed solvent, such as toluene, methyl ethyl ketone and acetic ether is not so good. Consequently, when the magnetic coating compound is prepared, the adsorptivity of a resin to the ferromagnetic powder and the dispersibility of the ferromagnetic powder become insufficient. Thereby, a stable resin adsorption layer was not obtained.

As a result, when the magnetic coating compound is preserved in a state of being standing or when a lubricant or a crosslinking agent is added to the magnetic coating compound while it is being stirred, a phenomenon that the dispersibility of the ferromagnetic powder is markedly deteriorated is observed. Consequently, a magnetic recording medium made by the use of the magnetic coating compound deficient in the dispersion stability could not give full scope to its satisfactory magnetostatic characteristic, electromagnetic transformation characteristic and surface characteristic of the medium.

Furthermore, for giving the strength necessary to the magnetic layer, various resins having high rigidity, into which a hydrophilic group is introduced, namely having a high glass transition temperature are developed. For example, MR-110 manufactured by Nippon Zeon Co., Ltd., which is one of vinyl chloride resins, as well as the aforesaid UR-8200, is a resin that belongs to the group. The glass transition temperature of them are both about 70° C. As for the latter, especially, it has higher softness and abrasion resistance in comparison with those of the former having almost the same glass transition temperature because of the molecular structure and the molecular weight of the latter.

However, it is required for a recent magnetic recording medium to have strength exceeding the necessary amount thereof owing to the increment of the relative speed to a recording and reproducing head and the like. Consequently, it becomes impossible to cope with such a situation by the use of a resin having the aforesaid degree of the glass transition temperature.

SUMMARY OF THE INVENTION

The present invention was made for improving the aforesaid situation, and aims to provide a magnetic recording medium having improved running durability as well as an improved magnetostatic characteristic, an improved electromagnetic transformation characteristic and an improved running stability by means of a specified binder, and further aims to provide a manufacturing method thereof.

A magnetic recording medium according to an aspect of the present invention includes a magnetic layer, main components of which are magnetic powder and a binder, and a non-magnetic substrate on which the magnetic layer is formed, wherein at least a part of the binder is a polyurethane resin including a propanediol derivative expressed by the following general formula as an ingredient, and a urethane group concentration in the polyurethane resin is 4,000 or more equivalents per 1 t of the resin,

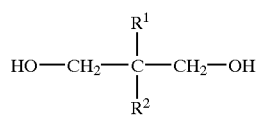

where either or both of $R^1$ and $R^2$ in the general formula is a saturated hydrocarbon group having a carbon number of 2 to 8 and the remnant is the saturated hydrocarbon group or a hydrogen atom.

Furthermore, a manufacturing method of a magnetic recording medium according to an aspect of the present invention, in which, when magnetic powder and a binder are kneaded and dispersed to prepare a magnetic coating compound and a magnetic layer is formed on a non-magnetic substrate by means of the magnetic coating compound for manufacturing the magnetic recording medium, the magnetic coating compound is prepared by means of a polyurethane resin at least as a part of the binder. The polyurethane resin includes a propanediol derivative expressed by the aforesaid general formula as an ingredient, and a urethane group concentration in the polyurethane resin is 4,000 equivalents or more per lt of the resin.

The inventors of the present invention assiduously made their endeavor of research on the improvement of a binder to be used for a magnetic recording medium. As a result, the inventors found that the polyurethane resin including a propanediol derivative expressed by the aforesaid general formula as an ingredient and the specified urethane group concentration as mentioned above is a binder answering the purpose.

That is, the binder has good dispersibility of the ferromagnetic powder into it. Moreover, even if the magnetic coating compound is preserved in a standing state or a lubricant, a crosslinking agent and the like are added to the magnetic coating compound, the dispersibility of the ferromagnetic powder of the binder is not easily deteriorated and the glass transition temperature of the binder can be heightened, for example, to be 100° C. or more.

Moreover, as it will be described, solubility of the polyurethane resin to the organic solvent often becomes worse as the urethane concentration becomes larger. In addition, since the ferromagnetic powder generally has a tendency to be easily coagulated as its particles are finer, it is difficult to disperse the ferromagnetic powder evenly in the magnetic layer. However, if the polyurethane resin defined as above is used as a binder, the dispersibility is improved and a magnetic coating compound having superior dispersibility and stability of the ferromagnetic powder is obtained. That is, it becomes possible to disperse the ferromagnetic powder evenly in the magnetic layer.

As a result, according to the present invention, there can be provided a magnetic recording medium having a good magnetostatic characteristic, a good electromagnetic transformation characteristic, a good running stability and good running durability.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 2 is a table showing various properties of polyurethane resins of embodiments of the present invention; and FIG. 3 is a table showing, various properties of sample tapes made by using the polyurethane resins shown in FIG. 2.

DESCRIPTION OF THE PREFERRED EMBODIMENTS

Figure 1:
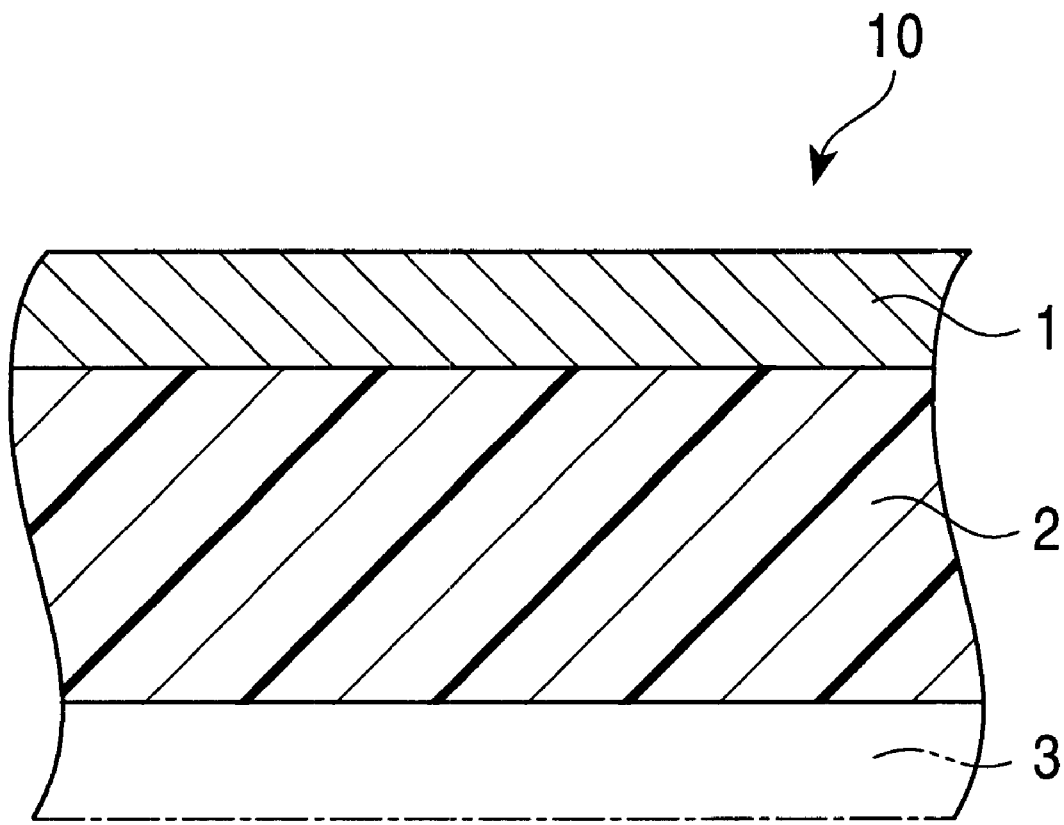
FIG. 1 is a schematic cross section showing an example of a magnetic recording medium according to the present invention.

In the present invention, the polyurethane resin having an aforesaid general formula is used as the whole or a part of a binder. The polyurethane resin should include a propanediol derivative expressed by the aforesaid general formula as an ingredient, and the concentration of urethane in the resin should be 4,000 equivalents or more per 1 t of the resin. If the concentration of the urethane group is less than 4,000 equivalents, the polyurethane resin cannot obtain a high glass transition temperature, and then the strength of a coat becomes small, and further the running durability of a magnetic layer becomes small.

Generally, when the concentration of the urethane group in the polyurethane resin is made to be larger, the cohesiveness of urethane groups among themselves frequently becomes too strong, and then the solubility of the polyurethane resin to an all-purpose organic solvent such as 2-butanone frequently becomes bad.

On the contrary, in the present invention, since the aforesaid propanediol derivative is used as a chain elongation agent and cohesion among the urethane groups or intermolecular cohesion is made to be weakened because of a steric hindrance effect of the saturated hydrocarbon groups, the carbon numbers of which are 2 to 8 respectively, (the aforesaid $R^1$ and $R^2$), the solubility of the polyurethane resin to the organic solvent is secured and the dispersibility and the stability of the ferromagnetic powder in the magnetic coating compound is improved.

If the carbon number of each of the branched saturated hydrocarbon $R^1$ and $R^2$ in the aforesaid general formula is less than two, the lengths of the branched chains are too short to develop the steric hindrance effect. In addition, if the carbon number is more than eight, coagulation among branches is conversely produced owing to the intertwinement among the branch chains and the crystallization among the branch chains, and thereby the solubility of the polyurethane resin to the organic solvent is deteriorated, and further the glass transition temperature is also lowered.

Furthermore, the polyurethane resin to be used in the present invention can heighten the glass transition temperature by selecting appropriately the chain elongation agent, and thereby the glass transition temperature can be heightened up to 110–120° C. that is higher than the upper limit of the glass transition temperature of 70–90° C. of an ordinary polyurethane resin, i.e. a polyurethane resin made by combining an ordinal chain elongation agent and di-isocyanate.

When the glass transition temperature of the polyurethane resin is thus heightened up to 100° C. or more, the durability of the magnetic layer can be improved. Moreover, when a curing agent is thrown into the magnetic coating compound, the gloss of the magnetic layer generally is lowered. However, when the aforesaid polyurethane resin is used, even if the curing agent is added to the magnetic coating compound, the amount of deterioration of the gloss is suppressed within 10% in comparison to the case where the curing agent is not added. Moreover, the degree of the deterioration can be controlled by means of the timing of adding the curing agent such as a polyfunctional isocyanate compound as the crosslinking agent or the addition amount of the curing agent. In this manner, it is noteworthy that the gloss of the magnetic layer could be improved along with the heightening of the glass transition temperature of the binder.

It is desirable that the propanediol derivative in the polyurethane resin is 2-butyl-2-ethyl-1,3-propanediol ($R^1$= butyl group, $R^2$=ethyl group).

Moreover, the propanediol derivative may be used as the chain elongation agent of the polyurethane resin, or may be used as the diol ingredient of the polyester diol for forming the polyurethane resin, or further may be used for both of them.

Moreover, the usage of the propanediol derivative is desirable to be 6–60 weight % of the total amount of the whole component substances of the polyurethane resin, and the number-average molecular weight of the polyurethane resin is desirable to be 5,000–100,000.

For manufacturing the polyurethane resin an ingredient of which is the propanediol derivative to be used in the present invention, e.g. 2-butyl-2-ethyl-1,3-propanediol, a generally well-known manufacturing method of the polyurethane resin may be applicable. For example, adding a diol ingredient (b) changed to have a middle to high molecular weight such as the polyester diol to a chain elongation agent (a) having a low molecular weight as the need arises, and combining them with difunctional isocyanate (c) to change the combined compound to be one having a high molecular weight.

Moreover, for using the 2-butyl-2-ethyl-1,3-propanediol as the diol ingredient in the polyester diol (b), it will do to add the prescribed amount of the 2-butyl-2-ethyl-1,3-propanediol to the chain elongation agent (a) as the diol ingredient in the aforesaid compounding method of the polyester diol for compounding them.

As the chain elongation agent (a), there are, for example, diol ingredients such as ethyleneglycol, 1,4-butanediol, neopentyl glycol, diamine such as ethylene diamine, tolylene diamine, water and the like.

Moreover, in a case of using the 2-butyl-2-ethyl-1,3-propanediol as the chain elongation agent (a), a prescribed amount of the 2-butyl-2-ethyl-1,3-propanediol may be added as the chain elongation agent (a) ingredient in the aforementioned synthesis method of the polyester polyurethane resin.

Now, the "prescribed amount" of the 2-butyl-2-ethyl-1, 3-propanediol is 6 to 60 weight %, preferably 15 to 60 weight %, of the total amount of the whole ingredients that is used for synthesizing the polyurethane resin (the situation is similar in cases of other propanediol derivatives). If the usage is below 6 weight %, the effects of the rise of the glass transition temperature and the improvement of the dispersion stability of a prepared magnetic coating compound are small.

As the difunctional isocyanate (c), there are, for example, tolylene di-isocyanate, diphenylmethane di-isocyanate, hexamethylene di-isocyanate, isophorone di-isocyanate and the like.

As the polyurethane resin synthesized like this and having the 2-butyl-2-ethyl-1,3-propanediol as an ingredient, the polyurethane resin having the number-average molecular weight of 5,000 to 100,000, preferably 10,000 to 60,000, can be utilized. If the molecular weight is less than the range, the durability of the magnetic layer easily becomes inferior. Moreover, if the molecular weight is larger than the range, the solubility of the resin to an organic solvent is inferior, and thereby the electromagnetic transformation characteristic easily becomes deteriorated. Moreover, it is desirable that the glass transition temperature of the polyurethane resin is 100° C. or more as mentioned above.

Furthermore, in the present invention, a hydrophilic group may be introduced at a moderate ratio into the polyurethane resin for improving the adsorptivity to the ferromagnetic powder and the dispersibility of the powder. As a method for introducing the hydrophilic group, there are some introducing methods such as the introducing of sodium sulfonic acid using a polyester polyol including sodium-5-sulfoisophthalic acid as a part of the diol ingredient (b), the introducing of a carboxylic acid using a dimethylol propionic acid, N-methyldiethanolamine, 3-diethylamino-1,2-propanediol as a part of the chain elongation agent (a), respectively, the introducing of a tertiary amine, and the like.

The polyurethane resin in the present invention is not limited to the polyester polyurethane resin, and for example a polyether polyurethane resin, a polycarbonate polyurethane resin and the like can be used. Those can use the propanediol derivative as, for example, a chain elongation agent.

Incidentally, in the present invention, the polyurethane resin may be used separately. However, it may be used together with other binders used generally for a coating type magnetic recording medium. As such other binders, any of a thermoplastic resin and a thermosetting resin may be used.

The polyurethane resin may be used together with well known binders such as polymers, e.g. polyvinylchloride, polyvinylacetate, polyvinylalcohol, polyvinylidenechloride, polyacrylate ester, polymethacrylate ester, polystyrene, polybutadiene, polyacrylonitrile and the like, a polyester resin and an epoxy resin.

Any of known ferromagnetic powders may be used as the ferromagnetic powder constituting the magnetic coating compound of the present invention and no limits exist.

Examples are ferromagnetic ferric oxide series particles, ferromagnetic chromium dioxide particles, hexagonal plate-like ferrite particles, ferromagnetic metallic particles and the like.

Furthermore, light metal atoms such as Al, Si, P and B to be added with a purpose of preventing sintering at the time of deoxidizing, keeping the shape thereof or the like may appropriately be included. One kind of the aforesaid materials may be selected as the ferromagnetic powder, or two or more kinds of the aforesaid materials may be selected as the ferromagnetic powder at the same time. Incidentally, it is preferable for realizing a change of the recording density to be high that a material having a large specific surface area is used.

Furthermore, as the organic solvent, or a solvent, used for dispersing such ferromagnetic powder and a binder to change them to be a coating compound, any of conventionally known solvents such as ketones, alcohols, esters, ethers, hydrocarbon solvents, halocarbon solvents may be used. They may appropriately be selected in accordance with the materials of the ferromagnetic powder and the binder.

Furthermore, a disperser, an abrasive, an antistatic additive, an anticorrosive and the like in addition to the ferromagnetic powder and the binder may be added to the magnetic coating compound as additives. Any of the materials usually used for the kind of the magnetic recording medium may be used as these additives.

Moreover, at the time of preparing the magnetic coating compound, the compounding ingredient may be dispersed and kneaded by a roll mill, a ball mill, a sand mill, a kneader, an extruder, a homogenizer, an ultrasound dispersion machine and the like. In addition, when the magnetic coating compound obtained like this is coated on the non-magnetic substrate, a gravure coater, a knife coater, a blade coater, a reverse-roll coater, a die coater and the like may be used.

As the non-magnetic substrate on which the magnetic coating compound is coated, there may be used high polymer substrates as typified by polyesters, polyolefins, cellulose derivatives, vinyl resins, polyimides, polyamides, polycarbonate and the like, metallic substrates composed of an aluminum base alloy, a titanium base alloy and the like, glass substrates and the like. The shape of the non-magnetic substrate is also not limited. Any shape such as a tape-like shape, a sheet-like shape, a drum-like shape may be applicable. Moreover, the non-magnetic substrate may be one the surface of which is treated to form fine convexo-concaves for controlling the surface characteristics thereof.

Incidentally, the magnetic recording medium to which the present invention is applied is not limited to one the magnetic layer of which is a single layer. It may be one composed of a plurality of laminated magnetic layers. Moreover, it may be applicable to form an intermediate layer or a non-magnetic layer between the magnetic layer and the non-magnetic substrate as the so-called undercoating layer.

Furthermore, as the occasion demands, a topcoat layer composed of a lubricant, an anticorrosive or the like may be formed on an upper surface of the magnetic layer. Also a back coat layer may be formed on a surface of the non-magnetic substrate where the magnetic layer is not formed, i.e. a back surface, for aiming the improvement of the running characteristic, antistat, anti-transfer and the like.

For forming the back coat layer, for example, solid particles such as an inorganic pigment are made to be dispersed in a binder, and then the binder including the solid particles is kneaded together with an organic solvent selected in accordance with the kind of the binder to prepare a coating compound for back coating. The coating compound for back coating is then coated on the back surface of the non-magnetic substrate.

As the solid particles, any conventionally known material may be used as far as it can give an antistat effect and a lubrication effect. For example, graphite, carbon black, a carbon black graft polymer, tungsten disulfide, molybdenum disulfide, titanium oxide and the like may be applicable. One kind of these solid particles may be used separately and two or more kinds of these solid particles may be used at the same time.

Furthermore, as the binder included in the back coat layer, any of conventionally known binders may be used. Any of the aforesaid thermoplastic resins and the thermosetting resins may be used as the conventionally known binders.

Incidentally, as the material constituting the back coat layer, a disperser, an abrasive, an antistatic additive or the like as an additive may be added in addition to the solid particles and the binders. Materials ordinarily used in the kind of the magnetic recording medium may be applicable as these additives. They are not limited especially.

Incidentally, FIG. 1 shows an example of a magnetic recording medium 10 of the present invention. The magnetic recording medium 10 has a magnetic layer 1 formed by coating a magnetic coating compound, main components of which are magnetic powder and a binder, on a surface of a non-magnetic substrate 2, and by drying the magnetic coating compound. A back coat layer 3, shown by a virtual line under the back surface of the magnetic recording medium 10, is formed on the back surface as the need arises. The magnetic recording medium 10 is a coating type magnetic recording medium, for example a magnetic tape.

EMBODIMENT

Hereafter, the present invention will be described as to a concrete embodiment. However, the present invention is not limited to the embodiment.

<Synthesis of Polyurethane Resin>

At first, a polyurethane resin for using as a binder of a magnetic layer was synthesized as follows.

Polyurethane resins A–F shown in FIG. 2 were obtained by causing a reaction for producing urethane from the following ingredients added by an appropriate amount respectively. That is, 2-butyl-2-ethyl-1, 3-propanediol (DMH) or neopentylglycol (NPG) as a chain elongation agent; polyester diol A having an average molecular weight of 2,000 and compounded from ingredients such as a terephthalicacid, an isophthalicacid, a neopentylglycol, and an ethyleneglycol as a long chain diol; a 3-diethyl-amino-1,2-propanediol (DEAPD) as a polar group source; diphenylmethane-di-isocyanate (MDI) as the di-isocyanate. There are also shown in FIG. 2 charge ratios of ingredient constituents of the respective polyurethane resins, their number-average molecular weights obtained by means of gel permeation chromatography (GPC analysis), and their glass transition temperatures obtained by means of differential scanning calorimetry (DSC).

Next, each compounding ingredient is blended in the following compound ratio for six hours with a sand mill together with those polyurethane resins as binders to prepare the magnetic coating compound.

<Compound Ratio of Magnetic Coating Compound>

Fe metal powder: 100 parts by weight (BET specific surface area: 55 $m^2/g$)
polyurethane resins A-F: 10 parts by weight
vinyl chloride resin: 10 parts by weight (manufactured by Nippon Zeon Co., Ltd., trade name: MR-110)
alumina: 5 parts by weight (average particle diameter: 0.3 $\mu$m)
carbon: 2 parts by weight (average particle diameter: 0.15 $\mu$m)
stearic acid: 1 part by weight
stearic acid butyl ester: 1 part by weight
methyl ethyl ketone: 100 parts by weight
toluene: 100 parts by weight
cyclohexanone: 100 parts by weight Next, after adding 4 parts by weight of a crosslinking agent (Coronate L, manufactured by Nippon Polyurethane Industry Co. Ltd.) to the thus prepared magnetic coating compound, the coating compound was coated on a polyethylene terephthalate film having a thickness of 7 $\mu$m so that the thickness of the magnetic layer after drying was 2.5 $\mu$m. And then, after performing magnetic orientation, the magnetic layer was further dried to be wounded. Furthermore, the magnetic coating compound was processed with super calender. After that, the magnetic coating compound was cured for a prescribed time at 70° C. for forming the magnetic layer. And then, after forming a back coat layer on the back surface of the film like an ordinary 8 mm videotape, the film was cut to have a width of 8 mm to be made as a sample tape.

In this case, a sample tape made by using the resin A as the polyurethane resin is denoted as sample tape A, and sample tapes made by using the resin B, the resin C, the resin D, the resin E and the resin F, respectively, were denoted as the sample tape B, the sample tape C, the sample tape D, the sample tape E and the sample tape F.

Evaluations of the dispersion stability, the magnetostatic characteristics, the electromagnetic transformation characteristics and the running durability of the thus made sample tapes A–F were performed.

At first, the evaluations of the dispersibility and the dispersion stability were executed by coating both of the magnetic coating compound to which the crosslinking agent was not added and the magnetic coating compound to which the crosslinking agent was added on the polyethylene terephthalate film, and by measuring the glosses (45°) of respective tapes to evaluate the dispersibility and the dispersion stability on the basis of the largeness of the lowering of the glosses.

The evaluations of the magnetostatic characteristics were performed by measuring the residual flux densities and the square-loop ratios of the sample tapes. And, the evaluations of the electromagnetic transformation characteristics were performed by recording a signal of 5 MHz to each of the sample tapes and by comparing the reproduced outputs and the Y-S/N ratios of the recorded signal with those of a signal recorded on a standard magnetic tape made by Sony Corporation.

As an evaluation of the running durability, evaluations of shuttle characteristics and powder fall amounts were performed. The shuttle characteristics were evaluated as follows. That is, first, recording a signal of 5 MHz on each sample tape having a length of recording for 120 minutes. Second, running the tape 20 times. Then the shuttle characteristics were evaluated on the basis of the deterioration of a reproduced signal after the shuttle to an initial reproduction signal.

The debris (powder fall amounts) was evaluated by observing debris to a head drum or a guide pin after shuttle running with human eyes. The debris were evaluated by allotting 0 point in a case where the debris was hardly observed, 5 point in a case where the debris was very much.

Incidentally, measurements were executed about 10 rolls per a kind of the sample tape, and the evaluation results were shown by average values of the measurements. The evaluation results were shown in FIG. 3.

As apparent from FIG. 3, sample tapes A, B and C to which the present invention was applied, show very good results in their dispersibility, dispersion stability, magnetostatic characteristics, electromagnetic transformation characteristics and running durability. The reason of these results is that the dispersibility of the ferromagnetic powder does not deteriorate because the solvent solubility of the polyurethane resins used as binders is good and then the adsorption states of the polyurethane resins are not changed even if crosslinking agents are added. It is the reason why each characteristic of the sample tapes after coating is good.

Furthermore, because the aforesaid polyurethane resin has a very high glass transition temperature and high coat strength, the coat strength thereof is not lowered even if the surface temperature thereof rises by the slides of the media at the time of shuttle running. The reason is that the durability of magnetic layers has improved.

On the other hand, sample tapes D and E did not show good results in their dispersion stability, magnetostatic characteristics, electromagnetic transformation characteristics and running durability. The reason is as follows. That is, because the solvent solubility of the polyurethane resins used as binders is not good, the adsorption states of the polyurethane resins are greatly changed when crosslinking agents are added. Although glosses before adding the crosslinking agents are large, the glosses deteriorate after adding the crosslinking agents. As a result, each characteristic of the sample tapes after coating has deteriorated. Furthermore, the urethane group concentrations of the used polyurethane resins were not so high, the glass transition temperatures were insufficiently high. Consequently, when the surface temperature becomes high by the slides between a drum or a head and the media, their coat strength becomes weak, and the lowering of outputs after shuttle running becomes large, and further debris becomes much.

Furthermore, the sample tape F also could not show good results in its dispersion stability, magnetostatic characteristic, electromagnetic transformation characteristic and running durability. The reason is as follows. That is, because the ingredient glycol of the polyurethane resin used as the binder is neopentyl glycol, its glass transition temperature does not rise so much even if its urethane group concentration is raised as high as possible. On the other hand, its solvent solubility is not insufficient in comparison with the polyurethane resin used in the embodiment, and thereby the sample tape after coating has inferior results in its dispersibility, magnetostatic characteristic, electromagnetic transformation characteristic and running durability.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A magnetic recording medium including a magnetic layer, main components of which are magnetic powder and a binder, and a non-magnetic substrate on which said magnetic layer is formed, wherein at least a part of said binder is a polyurethane resin including a propanediol derivative expressed by the following general formula as an ingredient, and a urethane group concentration in said polyurethane resin is greater than 4,000 equivalents per ton of said resin,

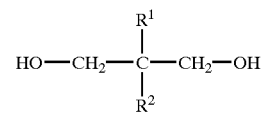

where either or both of $R^1$ and $R^2$ in the general formula is a saturated hydrocarbon group having a carbon number of 2 to 8 and the remnant is the saturated hydrocarbon group or a hydrogen atom.

2. A magnetic recording medium according to claim 1, wherein a glass transition temperature of said polyurethane resin is 100° C. or more.

3. A magnetic recording medium according to claim 1, wherein said propanediol derivative is a 2-butyl-2-ethyl-1, 3-propanediol.

4. A magnetic recording medium according to claim 1, wherein said propanediol derivative is used as a chain elongation agent of said polyurethane resin and/or used as a diol ingredient of a polyester diol for forming said polyurethane resin.

5. A magnetic recording medium according to claim 1, wherein a usage of said propanediol derivative is 6 to 60 weight % of the total amount of the whole component substances of said polyurethane resin.

6. A magnetic recording medium according to claim 1, wherein a number-average molecular weight of said polyurethane resin is 5,000 to 100,000.

7. A magnetic recording medium according to claim 1, wherein a polyfunctional isocyanate compound is included in a magnetic coating compound for forming said magnetic layer as a crosslinking agent.

8. A manufacturing method of a magnetic recording medium, wherein, when magnetic powder and a binder are kneaded and dispersed to prepare a magnetic coating compound and a magnetic layer is formed on a non-magnetic substrate by means of said magnetic coating compound for manufacturing said magnetic recording medium, said magnetic coating compound is prepared by means of a polyurethane resin at least as a part of said binder, said polyurethane resin including a propanediol derivative expressed by the following general formula as an ingredient, a urethane group concentration in said polyurethane resin being greater than 4,000 equivalents per resin ton of said resin,

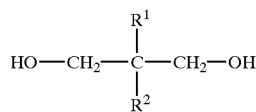

where either or both of $R^1$ and $R^2$ in the general formula is a saturated hydrocarbon group having a carbon number of 2–8 and the remnant is the saturated hydrocarbon group or a hydrogen atom.

9. A manufacturing method of a magnetic recording medium according to claim 8, wherein, when said magnetic powder and said polyurethane resin are kneaded and dispersed to prepare said magnetic coating compound, an amount of deterioration of a gloss of said magnetic layer formed in case of adding a curing agent at a last process is made to be within 10% of that formed in case of not adding the curing agent at the last process.

10. A manufacturing method of a magnetic recording medium according to claim 8, wherein a 2-butyl-2-ethyl-1,3-propanediol is used as said propanediol derivative.

11. A manufacturing method of a magnetic recording medium according to claim 8, wherein said propanediol derivative is used as a chain elongation agent of said polyurethane resin and/or used as a diol ingredient of a polyester diol for forming said polyurethane resin.

12. A manufacturing method of a magnetic recording medium according to claim 8, wherein a usage of said propanediol derivative is 6 to 60 weight % of the total amount of the whole component substances of said polyurethane resin.

13. A manufacturing method of a magnetic recording medium according to claim 8, wherein a number-average molecular weight of said polyurethane resin is 5,000 to 100,000.

14. A manufacturing method of a magnetic recording medium according to claim 8, wherein a glass transition temperature of said polyurethane resin is 100° C. or more.

15. A manufacturing method of a magnetic recording medium according to claim 8, wherein a polyfunctional isocyanate compound is included in said magnetic coating compound for forming said magnetic layer as a crosslinking agent.

16. A magnetic recording medium including a magnetic layer, main components of which are magnetic powder and a binder, and a non-magnetic substrate on which said magnetic layer is formed, wherein at least a part of said binder is a polyurethane resin including a propanediol derivative expressed by the following general formula as an ingredient, and a urethane group concentration in said polyurethane resin is 4,000 equivalents or more per ton of said resin,

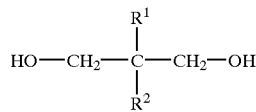

where either or both of $R^1$ and $R^2$ in the general formula is a saturated hydrocarbon group having a carbon number of 2 to 8 and the remnant is the saturated hydrocarbon group or a hydrogen atom, and wherein a glass transition temperature of said polyurethane resin is 100° C. or more, and wherein a number-average molecular weight of said polyurethane resin is 5,000 to 100,000.

17. A magnetic recording medium according to claim 16, wherein said propanediol derivative is a 2-butyl-2-ethyl-1,3-propanediol.

18. A magnetic recording medium according to claim 16, wherein said propanediol derivative is used as a chain elongation agent of said polyurethane resin and/or used as a diol ingredient of a polyester diol for forming said polyurethane resin.

19. A magnetic recording medium according to claim 16, wherein a usage of said propanediol derivative is 6 to 60 weight % of the total amount of the whole component substances of said polyurethane resin.

20. A magnetic recording medium according to claim 16, wherein a polyfunctional isocyanate compound is included in a magnetic coating compound for forming said magnetic layer as a crosslinking agent.

21. A manufacturing method of a magnetic recording medium, wherein, when magnetic powder and a binder are kneaded and dispersed to prepare a magnetic coating compound and a magnetic layer is formed on a non-magnetic substrate by means of said magnetic coating compound for manufacturing said magnetic recording medium, said magnetic coating compound is prepared by means of a polyurethane resin at least as a part of said binder, said polyurethane resin including a propanediol derivative expressed by the following general formula as an ingredient, a urethane group concentration in said polyurethane resin being 4,000 equivalents or more per resin ton of said resin,

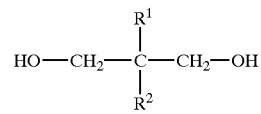

where either or both of $R^1$ and $R^2$ in the general formula is a saturated hydrocarbon group having a carbon number of 2–8 and the remnant is the saturated hydrocarbon group or a hydrogen atom, wherein a number-average molecular weight of said polyurethane resin is 5,000 to 100,000, and wherein a glass transition temperature of said polyurethane resin is 100° C. or more.

22. A manufacturing method of a magnetic recording medium according to claim 21, wherein, when said magnetic powder and said polyurethane resin are kneaded and dispersed to prepare said magnetic coating compound, an amount of deterioration of a gloss of said magnetic layer formed in case of adding a curing agent at a last process is made to be within 10% of that formed in case of not adding the curing agent at the last process.

23. A manufacturing method of a magnetic recording medium according to claim 21, wherein a 2-butyl-2-ethyl-1,3-propanediol is used as said propanediol derivative.

24. A manufacturing method of a magnetic recording medium according to claim 21, wherein said propanediol derivative is used as a chain elongation agent of said polyurethane resin and/or used as a diol ingredient of a polyester diol for forming said polyurethane resin.

25. A manufacturing method of a magnetic recording medium according to claim 21, wherein a usage of said propanediol derivative is 6 to 60 weight % of the total amount of the whole component substances of said polyurethane resin.

26. A manufacturing method of a magnetic recording medium according to claim 21, wherein a polyfunctional isocyanate compound is included in said magnetic coating compound for forming said magnetic layer as a crosslinking agent.

* * * * *